(No Model.)
W. D. MISENER.
HORSESHOE NAIL CLINCHER.
No. 462,268. Patented Nov. 3, 1891.
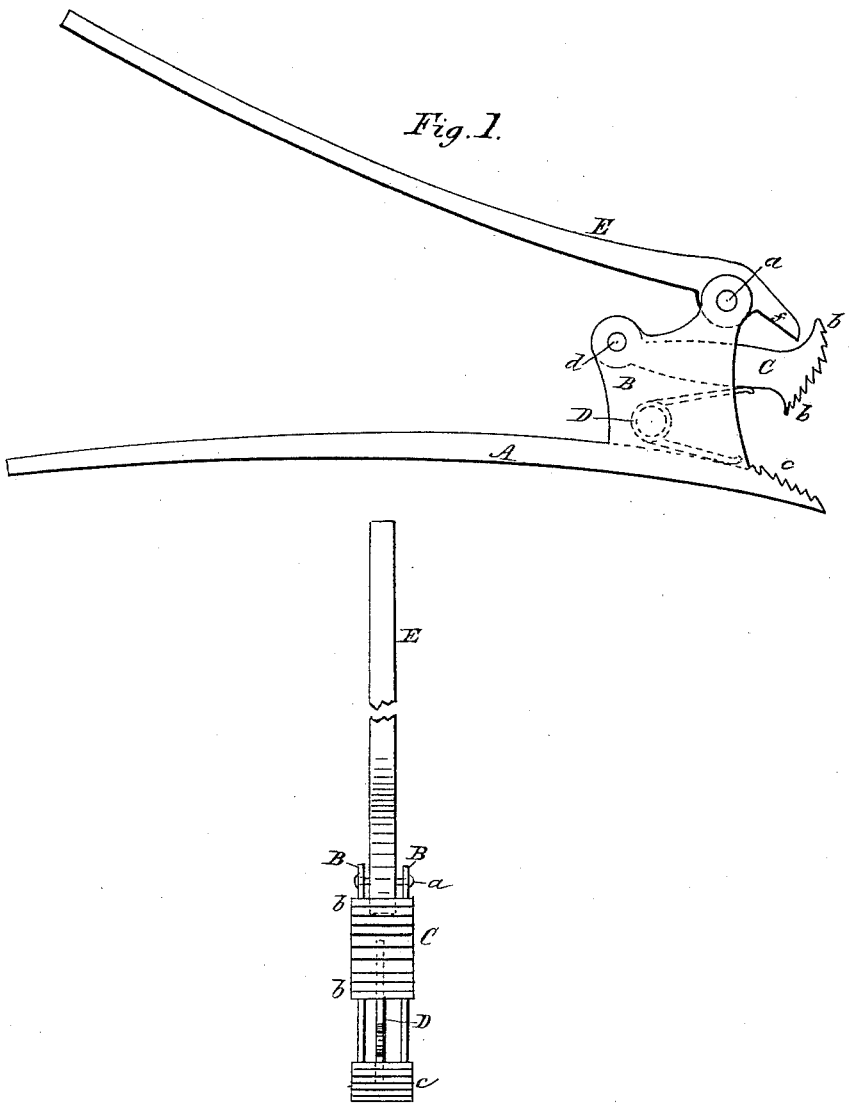

UNITED STATES PATENT OFFICE.

WILLIAM DRAKE MISENER, OF WATERDOWN, CANADA.

HORSESHOE-NAIL CLINCHER.

SPECIFICATION forming part of Letters Patent No. 462,268, dated November 3, 1891.

Application filed July 30, 1890. Serial No. 360,353. (No model.)

*To all whom it may concern:*

Be it known that I, WILLIAM DRAKE MISENER, a citizen of the Dominion of Canada, residing at Waterdown, in the county of Wentworth, in the Province of Ontario, Dominion of Canada, have invented a certain new and useful Improvement in Horseshoe-Nail Clinchers; and I do hereby declare that the following is a full, clear, and exact description of the construction and operation of the same.

The invention relates to a peculiarly-constructed instrument for clinching the nails in horses' hoofs while being shod that will possess much greater advantages and the work done more rapidly than with the present ordinary method of hammering, which is very objectionable.

The peculiar advantages attending the use of my device may be stated as follows: With quiet horses it will save fully one-third of the ordinary time in shoeing, and for young and nervous or sore and tender footed horses it will save more than one-half time, while the work is done better and with greater ease than with the hammer. The nails never drive up through the hoof and cause the clinch to project out ready to cut and tear the flesh of the opposite leg, as is very often the case with hammer-clinched nails. Horses are more quiet while being shod when my device is used. Consequently the shoer is much less liable to bodily injury and torn clothes while shoeing them.

By reference to the drawings forming part of this specification it will be seen that Figure 1 is a side view of my device, and Fig. 2 is an end view.

A is a handle formed at the outer end with corrugations $c$ on the upper side and two projecting parallel projections B.

C is a movable jaw, pivoted between the projections B by a pivot-pin $d$. Its outer end is curved and corrugated, as shown at $b\ b$.

D is a spring made to press upward against the outer end of the movable jaw C to separate it from the lower jaw $c$ of the handle.

E is a lever about the same length as the handle A, pivoted by a pivot-pin $a$ between the projections B. It is provided with a projecting point $f$, which, when the opposite end of the lever is elevated, the said point $f$ is impinged against the outer portion of the movable jaw C and depresses it according to the amount of pressure brought to bear on the handle end of the said lever E.

The operation of the device is as follows: A horseshoe is nailed on in the usual manner and the nails prepared for clinching. The part $c$ of my device is placed under the horse's hoof, the instrument being held by the handle A in one hand, while with the other hand the lever E is grasped and elevated, which depresses its outer end $f$ down upon the outer end of the pivoted jaw C, the corrugated outer edge of which is thus pressed down on that part of the hoof where the nails project, and each one is thus clinched until all are completed, the spring D raising the said jaw C, when the pressure from the long lever E is released therefrom. Each horseshoe-nail is thus neatly and effectually clinched without any of the objectionable results attending the usual method of hammering the hoof while shoeing horses.

I am aware of the patents to Kirk, No. 86,166, dated January 26, 1869; Mater, No. 117,793, dated August 8, 1871, and Dawson, No. 156,775, dated November 10, 1874, and I do not claim the construction shown therein, my invention being distinguished therefrom in comprising a horseshoe-nail clincher in which a short jaw pivotally supported between two handles or levers is actuated and pressed toward a stationary jaw on one of said handles by a projecting pointed end of the other lever or handle when said handles or levers are drawn apart.

Having thus described my device and its advantages, what I claim as my invention, and desire to secure by Letters Patent, is—

In a horseshoe-nail clincher, the combination of the handle A, provided at one end with a stationary jaw $c$ and with parallel lugs or projections B B, the short movable jaw C, pivotally supported between said lugs, the spring D, arranged between the jaws C and $c$ to normally separate the same, and the lever E, pivoted between the lugs B B on the outer side of the movable jaw C and provided with a projecting pointed end $f$ to impinge on said movable jaw and force it toward the stationary jaw when the handles or levers are drawn apart, substantially as described.

Dated at Hamilton, Ontario, this 17th day of June, 1890.

W. D. MISENER.

In presence of—
 O. I. BROWN,
 WM. BRUCE.